United States Patent [19]
Jeannin

[11] Patent Number: 5,929,940
[45] Date of Patent: Jul. 27, 1999

[54] METHOD AND DEVICE FOR ESTIMATING MOTION BETWEEN IMAGES, SYSTEM FOR ENCODING SEGMENTED IMAGES

[75] Inventor: Sylvie Jeannin, Paris, France

[73] Assignee: U.S. Philips Corporation, New York, N.Y.

[21] Appl. No.: 08/738,987

[22] Filed: Oct. 24, 1996

Related U.S. Application Data

[63] Continuation of application No. 08/738,987, Oct. 24, 1996.

[30] Foreign Application Priority Data

Oct. 25, 1995 [EP] European Pat. Off. .............. 95402388
Apr. 3, 1996 [FR] France .................................. 9604194

[51] Int. Cl.$^6$ ..................................................... H04N 5/16
[52] U.S. Cl. ............................................ 348/699; 348/416
[58] Field of Search ..................................... 348/699, 416, 348/413, 407, 409, 410, 411, 412, 467, 426; 382/233, 236, 238

[56] References Cited

U.S. PATENT DOCUMENTS

| | | | |
|---|---|---|---|
| 5,259,040 | 11/1993 | Hanna ...................................... | 348/409 |
| 5,267,034 | 11/1993 | Miyatake et al. ....................... | 348/352 |
| 5,295,201 | 3/1994 | Yokohama .............................. | 348/416 |
| 5,414,469 | 5/1995 | Gonzales et al. ....................... | 348/408 |
| 5,557,341 | 9/1996 | Weiss et al. ............................ | 347/699 |
| 5,598,226 | 1/1997 | Kokaram ................................ | 348/607 |
| 5,648,819 | 7/1997 | Trachard ................................ | 348/699 |
| 5,706,059 | 1/1998 | Ran et al. ............................... | 348/699 |

FOREIGN PATENT DOCUMENTS

| | | |
|---|---|---|
| 954023891 | 10/1995 | European Pat. Off. . |
| 0691789A2 | 1/1996 | European Pat. Off. . |

OTHER PUBLICATIONS

"VLSI Implementations For Image Communications", by P. Pirsch, Advances In Image Communication Mar. 2, 1995, pp. 19–40, 73, 217–218, 252–257, 312–313.

"Region–Based Motion Analysis For Video Encoding At Low Bitrates" By H. Sanson, CCETT, pp. 1–8, Published By ISO Under The Reference ISO/IEC–JTTC1/sc29/WG11/MPED94 In Mar. 1994.

"Differential Methods For The Identification Of 2D And 3D Motion Models In Image Sequences" J.L. Dugelay and H. Sanson, Signal Processing: Image Communication, vol. 7, No. 1, Mar. 1995, pp. 105–127.

"Coding Of Arbitrarily Shaped Image Segments Based On A Generalized Orthogonal Transform"By M. Gilge, T. Engelhardt And R. Mehlan, In The Magazine Signal Processing: Image Communication, vol. 1, No. 2, Oct.1989, pp. 153–180.

P. Cicconi et al, "Efficient Region–BAsesd Motion Estimation and Symmetry Oriented Segmentation for Image Sequence coding", IEEE Transactions on Circuits and Systems For Video Technology, vol. 4, No. 3, Jun. 1994, pp. 357–364.

Cha Keon Cheong, et al, "Structural Motion Segmentation for Compact Image Sequence Representationp", SPIE vol. 2727, pp. 1152–1163.

"A VLSI Architecture For Hierarchical Motion Estimation"—IEEE Trasactions on Consumer Electronics, vol. 41. No. 3, May 1995.

*Primary Examiner*—Tommy P. Chin
*Assistant Examiner*—Gims S. Philippe
*Attorney, Agent, or Firm*—Laurie E. Gathman

[57] ABSTRACT

Method and device for estimating motion between segmented images, or partitions, composed of a number I regions $R_i$. For performing the method, this device comprises a stage (41) for initializing parameters which describe the motion of each region $R_i$, in which one of different motion hypotheses chosen a priori is selected after prediction, computation of the prediction error and selection of the motion hypothesis to which the smallest prediction error corresponds. This stage (41) is followed by a stage (42) for intermediate processing by filtering, and a stage (43) for refining the motion parameters and is looped to the input of the stage (42) for an iterative operation until it ends at a given criterion so as to finally obtain I motion information $M_i(t)$ corresponding to the regions $R_i$.

11 Claims, 3 Drawing Sheets

METHOD AND DEVICE FOR ESTIMATING MOTION BETWEEN IMAGES, SYSTEM FOR ENCODING SEGMENTED IMAGES

This is a continuation of application Ser. No. 08/738,987 filed Oct. 24, 1996.

BACKGROUND OF THE INVENTION

The invention relates to a method of estimating motion between images forming a sequence $P(t-n)$, $P(t-n+1)$, ..., $P(t-2)$, $P(t-1)$, $P(t)$, ..., corresponding to a sequence $S(t-n)$, $S(t-n+1)$, ..., $S(t-2)$, $S(t-1)$, $S(t)$, ..., of segmented images, or partitions, composed of I regions $R_i$ identified by labels, and to a corresponding device for motion estimation. The invention also relates to a system of encoding segmented images by means of this method and device.

The invention is particularly suitable for encoding video signals in the field of very small bitrates and in the field of small bitrates up to approximately 1 Mbit/second. This range of bitrates notably corresponds to consumer applications, often termed as multimedia applications.

For ten to fifteen years, the compression of stationary or animated images has become a major industrial technological feature progressively covering numerous sectors: digital television, data storage, telemonitoring, videophone systems. However, other applications are currently coming up such as, for example, multimedia applications based on local data networks, the transmission of images to mobile systems, or videophone systems for switched telephone networks, constituting as many new challenges. While maintaining an equal image quality, these applications, which are based on media used at a lower cost because of their reduced passband, require compression rates which are higher than those used within the framework of the major image encoding standards such as H261, JPEG, MPEG1 or MPEG2. Moreover, services which are proposed for these media, enable users to interact on the contents of the video images, i.e. to have direct access to the different constituent objects in order to manipulate them. Several methods complying with these requirements of compression and interactivity will certainly be contradictory within the framework of standardization procedures for image encoding currently carried out by the MPEG committee (Moving Picture Experts Group) of the ISO (International Standardization Organization) for finalizing the future standard MPEG4 by 1998.

Whatever the method which will then be used, the necessity of compressing animated images requires efficient methods of compensating motion of these images and thus a pre-estimation of these motions. On the other hand, the necessity of being able to interact on the image contents requires a representation which is referred to as motion "object" of different elements of each of these images.

In a sequence of images, a conventional method of motion estimation between two of these images (referred to as previous and subsequent images) consists of subdividing each of these images into a bidimensional network of adjacent elementary blocks of equal dimensions and of applying the block matching method, hereinafter referred to as BMA—of Block Matching Algorithm—which is described, for example in the article "A VLSI architecture for hierarchical motion estimation" in the magazine "IEEE Transactions on Consumer Electronics", Vol. 41, No. 2, May 1995, pp. 248–257). This technique supposes that the blocks are sufficiently small (composed of, for example 16×16 pixels, which is a non-limitative example) so that the motion of each of these images can be considered as simple translations parallel to the plane of the image, while all the pixels of a block are supposed to have the same motion. Thus, a block of the subsequent image may be compared with blocks occupying the same position in the previous image or neighboring positions bounded by a search window so as to select that block from these previous blocks of a defined number which most resembles the reference block of the subsequent image. The relative position of the selected block and of the reference block defines a motion vector indicating the translation from one block to the other between the previous image and the subsequent image.

These comparison operations, which are repeated for all the blocks of the subsequent image, associate a field of motion vectors with these blocks. When the information corresponding to the pixels of a block is to be subsequently encoded and then transmitted and/or stored, it is sufficient to encode and then transmit and/or store the corresponding motion vectors instead: based on the block selected in the previous image, these vectors provide information about the new position of the block after its displacement in the subsequent image under consideration.

However, although this technique is also suitable for the applications mentioned hereinbefore, this technique has the following drawback, namely, the images are perceived as bidimensional signals without the effective contents of these images being taken into account: there is normally no reason that the contours of the elementary blocks and those of the objects which are really present in the scenes coincide. The block-matching method thus leads to degradation of the images, for example, when the boundary between two objects of an image which are each moving in a distinct manner is in the middle of a block. In this case, the motion estimation is no longer reliable and the restored images have a poor quality. When, in contrast, a region having a large surface area and a homogeneous motion comprises numerous blocks which are each associated with the same information, the resultant excessive redundance of information is also detrimental to the effectiveness of the encoding operation.

It should be noted that the motions between one image and another may be naturally very different. The local motion of objects, which may be assimilated with a translation in numerous cases, is often superimposed on motions of the pick-up camera, such as zoom (motion at a fixed or variable focus along an axis perpendicular or transversal axis to the plane of the images) and panning motions (motions of rotation at a sufficiently small angle around an axis which is substantially parallel to the plane of the images). If the local analysis of the motion has contributed, for example, to the determination of a field of motion vectors satisfactorily describing the translations between the blocks of one image and another, these global zoom and/or panning motions will disperse the field of vectors. A global analysis of the motions must thus be effected simultaneously, but the number of parameters describing all these motions becomes increasingly important.

In the envisaged applications, these restrictions of the BMA block-matching method has led to the development of other techniques which are based on a specific analysis of the image and on a better comprehension of its structure. This analysis consists of considering an image as the projection of a three-dimensional scene comprising stationary and animated objects and of trying to identify these different objects in each image and then estimate their representative parameters (which are related, for example to their shape, color, texture, motion, etc.), i.e. in a more general manner so as to define a segmentation of images into regions $R_i$ which are both individual and homogeneous with respect to a given criterion.

The document "Region-based motion analysis for video encoding at low bitrates" by H. Sanson, CCETT, pp. 1–8, published by ISO under the reference ISO/IEC-JTTCl/SC29/WG11/MPEG94 in March 1994, describes a method with which both a segmentation of images of a video sequence into regions homogeneous with respect to motion and a satisfactory estimation of the parameters describing the motions in these regions can be performed. However, this method only seems to be appropriate in situations where no information relating to the image contents is available.

SUMMARY OF THE INVENTION

It is a first object of the invention to propose a motion estimation method based, in contrast, on a previous knowledge of these image contents, which knowledge is obtained during an analysis step which has led to the segmentation of these images.

To this end, the invention relates to a method of estimating motion between images as defined hereinbefore, which method successively comprises, for supplying, per region $R_i$ and in the form of a motion vector defined by motion parameters, information $M_i(t)$ which is representative of the motion of the current image $P(t)$ with respect to a previous image $P(t-1)$, the following three operations each performed for each region of the current image:

(1) a first step of initializing the motion parameters of each region $R_i$ of the current image $P(t)$ as a function of the images before segmentation $P(t-1)$ and $P(t)$, segmented images $S(t-1)$ and $S(t)$, and motion information $M_i(t-1)$ estimated for the previous current image $P(t-1)$ in a previous performance of the method;

(2) a second step of intermediate processing of the images on which the estimation of the motion and of the parameters of this motion, is performed, and a third step of refining the motion parameters for the definitive determination of said parameters in the form of a vector (Dx, Dy) for all the pixels of the image of each of said regions $R_i$ in such a way that for each coordinate point (x,y) of the region, $L(x,y,t)=L(x-Dx, y-Dy, t-1)$, $L(.)$ designating the luminance or a video signal which is more complex, such as a combination of chrominance and luminance signals, and Dx, Dy being polynomials the degree of which is related to the type of motion of the region;

(3) the iterative repetition of said second and third steps of intermediate processing and refinement until the end of this iterative process as a function of at least a given criterion so as to finally obtain the I motion information $M_i(t)$.

The motion estimation method thus proposed is advantageous in several respects. On the one hand, the required execution time to obtain a given estimation quality is, on average, shorter when the estimation process starts from values which are closer to those constituting the definitive result of the estimation, and the additional time required to effect this initialization step is negligible with respect to the time for estimation itself. Moreover, this initialization accelerates the convergence of the proposed iterative process because the estimation method is supposed to provide only small relative variations of the motion parameters.

In accordance with an advantageous detail of the invention, said first step of initializing the motion parameters comprises the following sub-steps:

(A) a first sub-step of defining motion hypotheses for each region $R_i$ considered;

(B) a second sub-step of predicting, on the basis of the image $P(t-1)$, the region corresponding to each region $R_i$ in the image $P(t)$, taking each of the previous motion hypotheses into account, and of computing the corresponding prediction errors;

(C) a third sub-step of comparing said computed prediction errors for each region $R_i$ considered and of selecting, as an initial motion of this region, that motion hypothesis which corresponds to the smallest prediction error.

In a preferred embodiment of the method, said second step of intermediate processing comprises a filtering pre-processing operation by means of an isotropic Gaussian filter, while for the determination of the vector Dx, Dy associated with each region $R_i$ considered, the third refinement step comprises an operation of minimizing the sum of the square values of the prediction errors for the pixels of the image of said region $R_i$ or a sub-set of these pixels, this sum being written as: $\Sigma_{(x,y)} (L(x,y,t)-L(x-Dx,y-Dy,t-1))^2$, said minimization being effected, for example, by means of the Gauss-Newton approximation method, by effecting a first-order limited development of said sum after substituting Dx and Dy for $(Dx_0+dx)$ and $(Dy_0+dy)$, respectively, by making equal to 0 the derivatives of said limited development with respect to each coefficient of dx and dy, and by retaining, as variation values of the motion parameters leading to the smallest quadratic error, the solutions of the set of n equations with n unknown quantities obtained subsequent to these operations.

In a modification of the method, said three operations of initialization, intermediate processing and refinement may be followed by an additional operation of controlled propagation to the regions neighboring each region $R_i$ in accordance with which the following sub-steps are repeated for each region $R_i$:

(a) a new sub-step of predicting, on the basis of the image $P(t-1)$, each of said neighboring regions in the image $P(t)$, taking a motion hypothesis in these regions into account which corresponds to that associated with the motion parameters resulting from said definitive determination, and of computing the corresponding additional prediction error;

(b) a sub-step of comparing said additional prediction error and the prediction error associated with the motion hypothesis retained as the initial motion of the neighboring region considered, and of selecting, as motion of each of said neighboring regions, that one to which the smallest of these two prediction errors corresponds.

It is another object of the invention to provide a motion estimation device with which this method can be carried out.

To this end, the invention relates to a device for estimating motion between images forming a sequence $P(t-n)$, $P(t-n+1)$, ..., $P(t-2)$, $P(t-1)$, $P(t)$, ..., corresponding to a sequence $S(t-n)$, $S(t-n+1)$, ..., $S(t-2)$, $S(t-1)$, $S(t)$, ..., of segmented images, or partitions, composed of I regions $R_i$ identified by labels, which device is characterized in that, for supplying, per region $R_i$ and in the form of a motion vector defined by motion parameters, information $M_i(t)$ which is representative of the motion of the current image $P(t)$ with respect to a previous image $P(t-1)$, the device successively comprises the following three stages, namely a first stage for initializing the motion parameters of each region of the current image by selecting motion hypotheses and by choosing, for each region, that motion for which the sum of the square values of the prediction errors in the pixels of the image of the region is minimal, a second stage for intermediate processing, and a third stage for refining the motion parameters by an approximated determination of the vector (Dx,Dy) associated with each region, said second and third stages being provided in a loop in accordance with an iterative process until the end of this process as a function of a given criterion.

Another object of the invention is to provide an encoding system suitable for performing the method and the motion estimation device in a system for encoding segmented images.

To this end, the invention relates to a system of encoding segmented images, or partitions, corresponding to a sequence of initial images in which said partitions are bounded by contours and regions identified by associated labels, said system comprising means for generating, for each successive partition referred to as current partition, encoded signals corresponding to a partition referred to as optimal partition and composed either of regions extracted from a partition referred to as main partition and determined directly by motion estimation and compensation of a partition preceding said current partition, or of regions extracted from additional partitions created by merging or, in contrast, by resegmentation of regions of said main partition, characterized in that, in view of said possible merging, the system comprises at least a circuit for merging the regions, comprising a motion estimation device as defined hereinbefore and a device for proposing the merging of regions concerned.

These and other aspects of the invention will be apparent from and elucidated with reference to the embodiments described hereinafter.

DETAILED DESCRIPTION OF THE PREFERRED EMBODIMENTS

Figure 1:
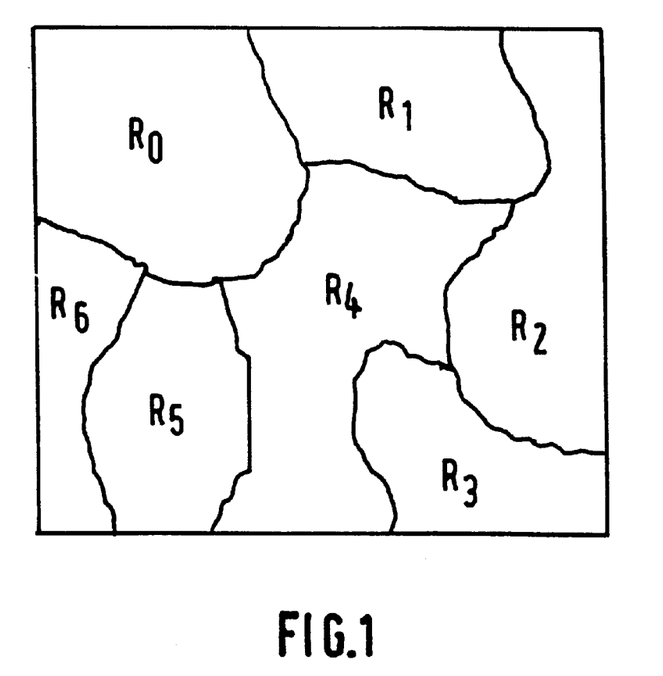
FIG. 1 shows an example of a segmented image, the segmentation resulting from a pre-analysis of the original images (it will be noted that the principle of segmentation itself, in whichever form, does not form part of the invention)

Before describing the invention in detail, the different notations used will be defined herebelow, which notations will be used throughout the description. The images considered form part of an original sequence of textured images, denoted P(t−n), P(t−n+1), ..., P(t−2), P(t−1), P(t), etc. In the description which follows the focus is principally on P(t), the current image, and on P(t−1) which is the previous original image (or the previous encoded image, in accordance with the characteristics of the encoding process performed after the motion estimation). From a practical point of view, these two textured images P(t−1) and P(t), between which the motion estimation is effected at the instant t, are the images of the luminance signal in this case, but may also correspond either to a combination of luminance and chrominance signals in the case where the color contains much specific information, or to any other transform of original images restituting the information of the signal. The value of the luminance at an arbitrary point (x,y) in one of the images P(t−2), P(t−1), P(t), etc. is denoted L(x,y,t−2), L(x,y,t−1), L(x,y,t), etc. Concerning the operation of segmenting the images, a sequence of images of labels (also referred to as partitions) corresponds to the sequence of original images, and the segmented images are referred to as S(t−1), S(t) and correspond to the original textured images P(t−1), P(t) and finally form a sequence of a certain type of images resulting from a pre-analysis which is required to carry out the motion estimation method. FIG. 1 illustrates an example of segmenting an image into seven regions $R_i$, with i=0 to 6.

Figure 2:
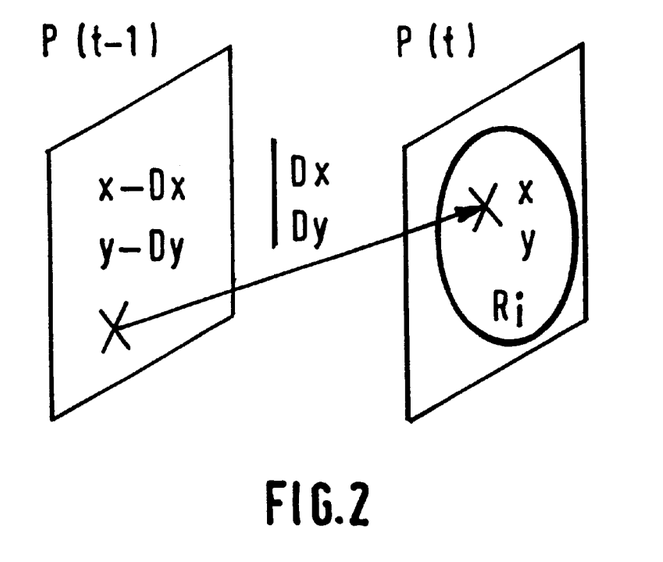
FIG. 2 diagrammatically shows a motion between two successive images P(t−1) and P(t)

The information relating to the motion of the current image P(t) with respect to the previous image P(t−1) is arranged under the reference $M_i(t)$ for the region $R_i$ of the image P(t). This reference $M_i(t)$ includes the data constituted by the type of motion retained (i.e. the order or degree of the polynomial representing this motion) and the values of the corresponding parameters (i.e. the values of the coefficients of the polynomials). For example, as illustrated in FIG. 2, a displacement vector (Dx,Dy) from P(t−1) to P(t), with Dx and Dy being polynomials at x and y whose coefficients are the motion parameters, corresponds to a type of motion determined between the images P(t−1) and P(t) at a point (x,y) of a region $R_i$ of P(t). This can be written as L(x,y,t)= L(x−Dx,y−Dy,t−1). The degree of these polynomials (0, 1 or 2) and the number of coefficients defining them (from 2 to 12 parameters) depend on the type of motion considered:

(a) two parameters are sufficient for defining the translation of a plane facet parallel to the image in a plane parallel to the image:

$Dx=a_1$, $Dy=a_2$ (b) for a motion of the zoom and/or panning type, four parameters are necessary for modeling the motion of translation of a plane facet parallel to the plane of the image if the facet has an arbitrary orientation, or has an arbitrary translation motion of this facet if it is parallel to the plane of the image:

$Dx=a_1+a_2x+a_3y$ $Dy=a_4-a_3x+a_2y$ (c) for a related transform, six parameters are necessary for modeling a translation motion as indicated under (b) above or a rotational motion of a plane facet around an axis perpendicular to the plane of the image:

$Dx=a_1+a_2x+a_3y$ $Dy=a_4+a_5x+a_6y$ (d) for a quadratic motion, twelve parameters are necessary for modeling arbitrary rotations and translations of the curved facets:

$$Dx = a_1 + a_2 x + a_3 y + a_4 x^2 + a_5 xy + a_6 y^2$$
$$Dy = a_7 + a_8 x + a_9 y + a_{10} x^2 + a_{11} xy + a_{12} y^2$$

These polynomial models have been adopted because it is possible to show that they represent the motion of objects in a satisfactory manner. However, they cannot be interpreted as a strict description of the real three-dimensional motion of these objects. For this purpose, it is necessary to have the certainty that the objects are rigid and that their form is also known, which is not the case. The models in question are thus simply a representation of the deformation of the projection of the objects in the image plane (for example; in the case of two parameters, the model effectively describes a translation in the image plane, supposing that the object concerned is rigid and has a plane surface which is parallel to the image plane). A detailed representation of these motion models is given, for example in the article "Differential methods for the identification of 2D and 3D motion models in image sequences", J. L. Dugelay and H. Sanson, Signal Processing: Image Communication, Vol. 7, No. 1, March 1995, pp. 105–127.

The coordinates of a point in an image are denoted throughout the description in capitals (X,Y) or in lower case (x,y), dependent on whether they are expressed with respect to a global reference related only to the image or with respect to a local reference related to a given region of the image.

As these notations have been recalled, it is useful to also recall that, in this case, the objective of motion estimation is to provide the possibility of subsequently restoring a predicted image R(t) constituting an approximation of P(t), based on the segmented image S(t), of the previously restored image R(t-1) corresponding to P(t-1), and information $M_i(t)$ obtained during the motion estimation. Such a determination of R(t) provides, inter alia, the subsequent possibility of encoding the prediction error only, i.e. the difference between P(t) and R(t).

Figure 3:
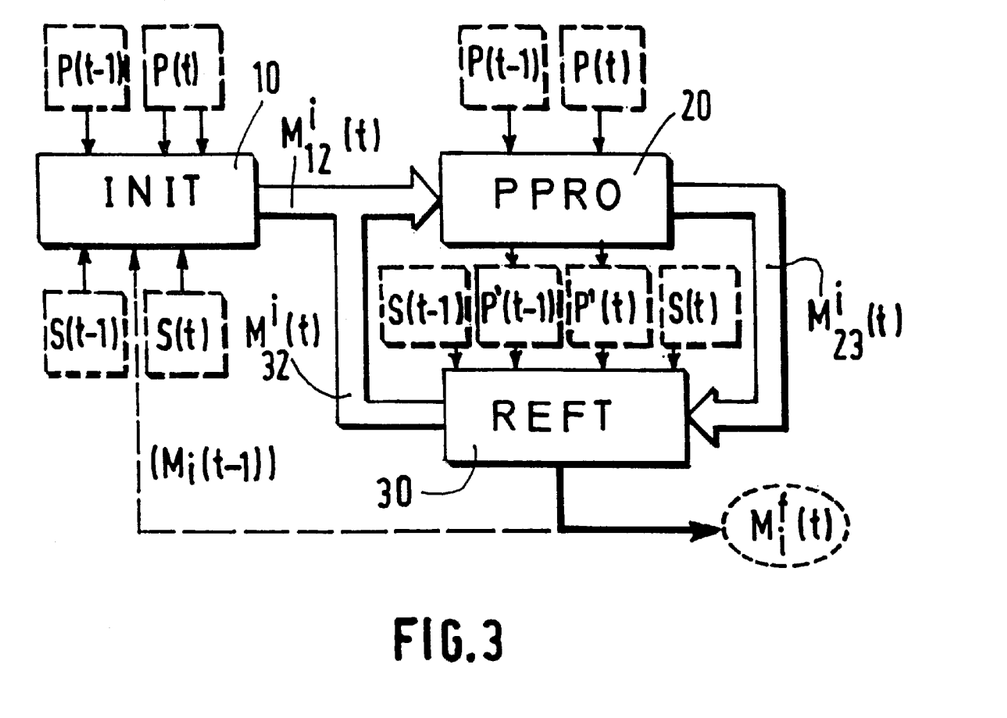
FIG. 3 illustrates the steps of the estimation process according to the invention, which is of an iterative nature.

The method according to the invention can now be described in detail with reference to FIG. 3. It comprises successively a first step 10 of initializing the motion parameters (INIT), a second pre-processing step 20 (PPRO), and a third step 30 of refining the motion parameters (REFT), each performed for each region of the current image.

The first step 10 of initializing the motion parameters has for its object to start the motion estimation process with motion parameter values for each region $R_i$ of the image P(t) considered, which values are as close as possible to the final real values of these parameters so as to be able to suppose, throughout the processing operations envisaged, that the motion parameters have small variations. Moreover, the required execution time for obtaining a given estimation quality is, on average, shorter if one starts the estimation process with parameter values which are closer to the searched real values, which additional execution time of said first initialization step is negligible with respect to that of the estimation itself. It should be prevented that in the course of these processing operations, which, as will be seen, are effected in an iterative manner, the convergence can be produced at a local minimum, which would have more chances of being produced if the initial values were too remote from said searched real values.

In three sub-steps referenced (A), (B) and (C) and performed for each region $R_i$ of the image P(t), the first step thus consists of:

(A) exploiting at best the information which is initially available at the input, and possibly gathering new information for deducing probable motion hypotheses;

(B) for each of said motion hypotheses (expressed hereinafter) and based on known data for the image P(t-1), predicting the region concerned in P(t) and computing the corresponding prediction error;

(C) selecting, as initial values of the motion parameters, those values which generate the smallest prediction error (which simultaneously validates one of the motion hypotheses).

The first sub-step (A) of the step 10 of initialization INIT consists of exploiting the initial data, which are:

(a) the original images P(t-1) and P(t);
(b) the images of the labels S(t-1) and S(t);
(c) the data $M_i(t-1)$, i.e. the motion information (type of motion and values of corresponding parameters), including the case where the motion is zero, permitting, during the previous cycle (i.e. based on the image P(t-2)) to know the motions which lead to the image P(t-1);
(d) the data resulting from performing the BMA technique (described above) between the images P(t-1) and P(t), namely a displacement vector defined for each pixel of P(t), and in general at about one pixel (or possibly at about half a pixel).

For each region $R_i$ of P(t), four motion hypotheses with respect to the previous image have successively been taken into consideration in this case, taking their complementarity and simplicity of formulation into account in view of the available information:

(1) the motion of the region $R_i$ is zero;
(2) the label i considered already existed in S(t-1) and the motion of the region is only a translation parallel to the image plane: it is then sufficient to compute the coordinates of the center of gravity of the label i in S(t-1) and S(t) and then the difference between these coordinates, which yields the displacement vector;
(3) the label i considered already existed in S(t-1): j designating each label near i in S(t-1) and the data $M_i(t-1)$ and $M_j(t-1)$ being expressed in the local reference associated with i, all the labels j neighboring i in S(t-1) are searched and then the corresponding data $M_j(t)$ are read (type of motion and values of corresponding parameters converted in this local reference), and the best motion between the label i and its neighboring labels is chosen;
(4) the motion obtained is that which corresponds to the best approximation of the field of displacement vectors resulting from an adaptation of the BMA technique per region (only the displacements computed for blocks of more than half the number included in the region i considered being taken into account), said adaptation consisting of a sequence of translational motion estimations of blocks having a variable size and of relaxations so as to subsequently determine an approximation of the field of vectors by means of a more complex model and with the aid of a regression technique (this method of adapting the polynomial from a set of values is similar to the polynomial approximation method described, for example for encoding textured images in the article "Coding of arbitrarily shaped image segments based on a generalized orthogonal transform" by M. Gilge, T. Engelhardt and R. Mehlan, in the magazine "Signal Processing: Image Communication, Vol.

1, No. 2, October 1989, pp. 153–180, which example is not limitative).

The second sub-step (B) of the step 10 for initialization INIT consists of predicting, on the basis of P(t−1), the corresponding region in P(t), taking into account each motion hypothesis effected during the sub-step (A), and of subsequently computing each time the prediction error for the region. The following prediction principle is used: with P(t−1), S(t) and M$_i$(t) being known, the predicted luminance value in the image P(t) is determined at a position X,Y of a pixel. The detailed description of the prediction will be given hereinafter in the part dealing with the refinement, for the definitive estimation of the motion parameters.

Finally, the third sub-step (C) of the step 10 for initialization INIT consists of comparing the computed prediction errors in a region and of preserving, as initial motion of the region, that one to which the smallest prediction error corresponds. The process is repeated for each region and the first initialization step 10 is ended when the motion parameters have thus been adjusted for all the regions of P(t). The set of initial parameters thus determined for a region R$_i$ is designated by the reference M$^i_{12}$(t) in FIG. 3.

The second intermediate processing step 20 has for its object to facilitate the estimation of definitive motion parameters obtained at the end of the third and last step. Without this being the only possibility, an essential processing operation for obtaining this objective is to modify the luminance signal so as to bring it closer to the theoretical ideal (a first-order function) i.e. so as to verify the mathematical hypothesis required by the theory in order to obtain a convergence of the estimation process. This processing operation consists of a filtering of P(t−1) and of P(t), for example by using an isotropic Gaussian filter in the four directions of the plane (S(t−1), S(t), M$_i$(t) are not modified). This choice of filter ensures a very good compromise between a smoothing of the contours, which is useful for simplifying the luminance signal in the image and facilitating the convergence by avoiding the local minima as much as possible, and the maintenance of a sufficient localization of these contours in the image (it is desirable to preserve enough details of the image in order that the precision of the estimated motion is sufficient). The filtered images are designated by the references P'(t−1) and P'(t) in FIG. 3. The set of motion parameters available after this preprocessing operation realized during step 20 is designated by the reference M$^i_{23}$(t) in FIG. 3.

The third step 30 of refining the motion parameters, which step is iterative, has for its object to effect the definitive estimation of the motion parameters for the region concerned. The iterative process performed during this step ends at a given criterion, for example when a number of iterations fixed in advance is reached (other criteria may also be proposed, such as a stop of iterations when a sufficient quality during motion compensation permitting the previous motion estimation is reached or when the improvement for the new iteration becomes negligible, or even a combination of several criteria).

First of all, it should be recalled that, for each region of P(t), a vector (Dx,Dy) is searched so that, for each point in the region, L(x,y,t)=L(x−Dx,y−Dy,t−1), in which Dx and Dy are polynomials of a degree related to the type of motion for the region considered. The equality between these two terms L(.) can only be realized in a more or less approximative manner in accordance with the degree of quality of the motion estimation, but in order that this approximation is as satisfactory as possible, the criterion used is the one for determining the smallest quadratic error: the sum of the square values of the prediction errors in the pixels of the region is minimized, i.e. the following expression:

$$\Sigma(L(x,y,t)-L(x-Dx,y-Dy,t-1))^2 \tag{1}$$

for x and y taking all the values corresponding to the coordinates of the pixels in the region R$_i$ considered. This expression (1) is denoted in an abbreviated form in the following manner (DFD=Displaced Frame Difference):

$$\Sigma_{x,y}(DFD(x,y,Dx,Dy))^2 \tag{2}$$

It is known that such a mathematical minimizing operation (of expression (2)) may be notably effected by means of the Gauss-Newton method for which Dx=(Dx$_0$+dx) and Dy=(Dy$_0$+dy) with dx and dy being very small with respect to Dx$_0$ and Dy$_0$, respectively. By first-order development, we obtain:

$$L(x-Dx,y-Dy,t-1)=L(x-Dx_o,y-Dy_o,t-1)$$
$$-dx\left(\frac{\partial}{\partial x}L(x-Dx_o, y-Dy_o, t-1)\right) \tag{3}$$
$$-dy\left(\frac{\partial}{\partial y}L(x-Dy_o, y-Dy_o, t-1)\right)$$

The expression (1) to be minimized thus will be:

$$\Sigma_{x,y}[DFD(x,y,Dx_0,Dy_0)$$
$$-dx\left(\frac{\partial}{\partial x}L(x-Dx_o, y-Dy_o, t-1)\right) \tag{4}$$
$$-dy\left(\frac{\partial}{\partial y}L(x-Dx_o, y-Dy_o, t-1)\right)]^2$$

In this expression (4), the derivatives with respect to each of the coefficients of dx and dy are made equal to 0 eliminated in order to characterize the minimum of this expression with respect to the motion parameters, which leads to a set of n equations with n unknown quantities.

The solutions of this set of equations are the variations of the motion parameters leading to the smallest quadratic error. To resolve this, it is expressed in a matrix form:

$$[A].[x]=[B] \tag{5}$$

The vector x represents the searched parameters and the terms of the matrices depend on the coordinates of the pixels of the current image, on the gradients which are horizontal and vertical to the previous positions of the pixels (in the previous image) and on the luminance values at these positions in the current and the previous image. For each region R$_i$ of S(t) and at each iteration, the matrices A and B must be constructed, the matrix A must be inverted and the inverse matrix thus obtained must be multiplied by the matrix B to obtain the vector solution x: the motion information (for the region R$_i$) may then be updated by adding components of this vector solution x to the previous expression of this motion information.

For constructing the matrix A, the luminance values must be computed at the points in the previous image corresponding to previous positions of the points in the current image, of which the motion and the positions in this current image are known—it is the prediction operation described below—and the values of the horizontal gradient and the vertical gradient at similar points must be computed. The computations must be performed on values of parameters expressed in their local reference (i.e. related to the region). For each region, two sets of parameters are stored, on the one hand, the parameters during estimation, while converging, which is denoted $M_i^{cv}(t)$, and, on the other hand, the parameters giving the best results for the region, which is denoted $M_i^f(t)$. At the start of the refinement step 30, these two motions are equal to the initial motion ($M_{12}^i(t)$ in FIG. 3) originating from the initialization of the processed parameters. Subsequently, $M_i^{cv}(t)$ is defined in an iterative manner and substituted at the end of each iteration for $M_i^f(t)$ which corresponds to the motion giving the best results among the following motions for the region under study: either the parameters $M_i^{cv}(t)$ correctly computed for the current region, or the parameters $M_j^{cv}(t)$ of the regions j neighboring i in S(t), which motions are reconverted in the local reference corresponding to the region i. Finally, this retained motion may give rise to a propagation towards the neighboring regions: for these neighboring regions, the search for the smallest prediction error on the basis of this motion is resumed, which is selected if it effectively leads to a smaller prediction error, and so forth. At the output of each iteration of the refinement step, the motion information determined for each region i of S(t) is sent towards the input of step 20 (parameters designated by $M_{32}^i(t)$ in FIG. 3)

The prediction operation which is necessary for the construction of the matrix A will now be described. Given a pixel of coordinates (X,Y), the prediction enables determination of the predicted luminance value at this position at the instant t, denoted L(X,Y,t), based on S(t), P(t−1) and M(t). This operation, which is performed at each point of the image, consists of two steps:

(a) computation of the non-integral coordinates of this pixel at the instant (t−1):

search of the label i of the region to which the pixel belongs by reading the image of the labels S(t) at the position (X,Y);

for this pixel, selection of its motion information (type of motion and value of the parameters) by reading $M_i(t)$ for this label;

computation of the displacement (Dx,Dy) of the pixel as a function of its coordinates, of the type of motion and the value of the parameters of its region (for example, in the case of a related motion, for which there are 6 parameters, one has: (Dx,Dy =($a_1+a_2.X+a_3.Y,a_4+a_5.X+a_6.Y$) if the motion parameters are expressed with respect to the global reference, or (dx,dy)=($a_1+a_2.x+a_3.y,a_4+a_5.x+a_6.y$) if the motion parameters are expressed with respect to a local reference at their region), said displacement thus providing the possibility for this pixel of deducing its coordinates at (t−1): (X−Dx,Y−Dy) (if these coordinates are outside the image, one takes the coordinates of the closest point associated with the image, but the coordinates found are not necessarily integral values because the parameters are not, and thus an interpolation must be carried out for deducing the luminance at this point);

(b) computation of the luminance and its coordinates in P(t−1): the luminance is interpolated in the present case by using a bicubic monodimensional filter having a length 5 with a precision of ¹⁄₁₆th of a pixel (the interpolation is effected horizontally and vertically with the same filter, by means of an operation referred to as mirroring at the edges of the image in the case of pixels at the edge of the image so as to obtain two luminance values, the mean value of which is preserved).

For the computations of the gradient, it is necessary to interpolate their values, similarly as for the luminance. To ensure the coherence of this operation with the interpolation used during prediction, the filter used is derived from that used for the luminance, of length 5, with a precision at ¹⁄₃₂nd of a pixel. The interpolation technique is the same as for the luminance, except that the values resulting from the horizontal and vertical filtering operations are used independently and are thus not averaged (the same mirroring operation as for the luminance may be performed).

In theory, the matrix A must be constructed with the aid of a sum of terms at all the points of the region. Certain points may be error factors (association with a small object or parasitic motion, with an uncovered zone . . . ). A simple restriction of selecting the points is to preserve only the points (x,y) whose motion actually estimated is such that S(x,y,t)=S(x−Dx,y−Dy,t−1). This restriction is the more efficient as the segmentation is more coherent with the contents of the image.

Once the matrix A is constructed, it is tested whether it is singular or not. If it is not, an inversion by means of the method referred to as the Householder method is performed. If it is, the motion is not refined and the motion parameters (the information $M_i^{cv}$) remain unchanged at the start of this iteration and one proceeds directly to the selection of the better motion. The region is predicted by using the information $M_i^{cv}(t)$ which has been supplied in the refinement step, and the information $M_j(t)$ corresponding to every region j neighboring i in S(t) and expressed in the local reference at i. The prediction error in the region is computed each time. If all the errors are higher than those corresponding to the previous information $M_i^f(t)$, this better motion remains unchanged. If not, the motion generating the smallest prediction error is definitively retained, and the corresponding, new information is denoted $M_i^f(t)$. As has been seen above, a controlled propagation of the retained motion is possible. For each region $R_j$ adjacent to $R_i$, the prediction error in this region is computed on the basis of parameters $M_i^f(t)$, and $M_j^f(t)$ is substituted by $M_i^f(t)$ if this error is smaller than the prediction error obtained from $M_j(t)$.

Figure 4:
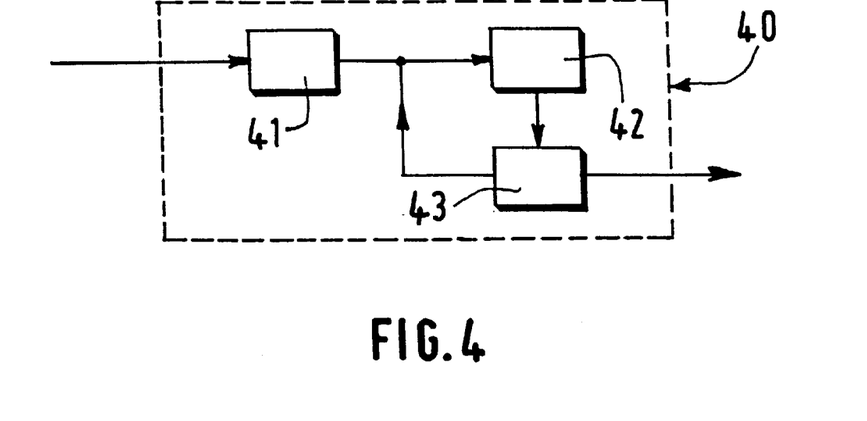
FIG. 4 shows an embodiment of a motion estimation device for performing the method.

The method described hereinbefore may be performed in a motion estimation device 40 shown in FIG. 4, which in this case comprises a first stage 41 for initializing the motion parameters of each region of the current image, for performing the first initialization step 10 by selecting the motion hypotheses and by choosing, for each region, that motion for which the sum of the square values of the prediction errors in the pixels of the region is minimal, followed by a second intermediate processing stage 42 for performing the second step 20, and a third stage 43 for refining the motion parameters for performing the third step 30 by an approximated determination of the vector (Dx,Dy) associated with each region. These second and third stages 42 and 43 are provided in a loop in accordance with an iterative process until the end of this process as a function of a given criterion (in this case, the intermediate processing operation comprises an isotropic Gaussian filtering operation intended to accelerate the convergence of this iterative process).

A particularly important use of this motion estimation device is its place in a system for encoding segmented images as described in European Patent Application No. 95402389.1 filed on 25 Oct. 1995. Without recalling all the details of the system described in this Application, it is useful to define its essential characteristic. More particularly, this system intended for encoding segmented images, or partitions, corresponding to a sequence of initial images in which said partitions are bounded by contours and thus by regions identified by associated labels, comprises, before the encoding itself, an assembly of means for generating, for each successive partition referred to as current partition, a partition referred to as optimal partition and defined in accordance with a specific process based on said current partition.

This optimal partition is conventionally composed of juxtaposed regions, but the source of these regions is original: they are regions either extracted directly from a main partition, or projected partition, determined by motion estimation and compensation of a partition preceding the current partition, or regions extracted from additional partitions created by merging or, in contrast, by resegmentation of regions of said main partition. A kind of tree of partitions at various levels of regions is thus constituted, providing an assembly of regions from which, by means of a process of decisions, the final set of regions constituting the optimal partition to be encoded is chosen for each current partition.

Figure 5:
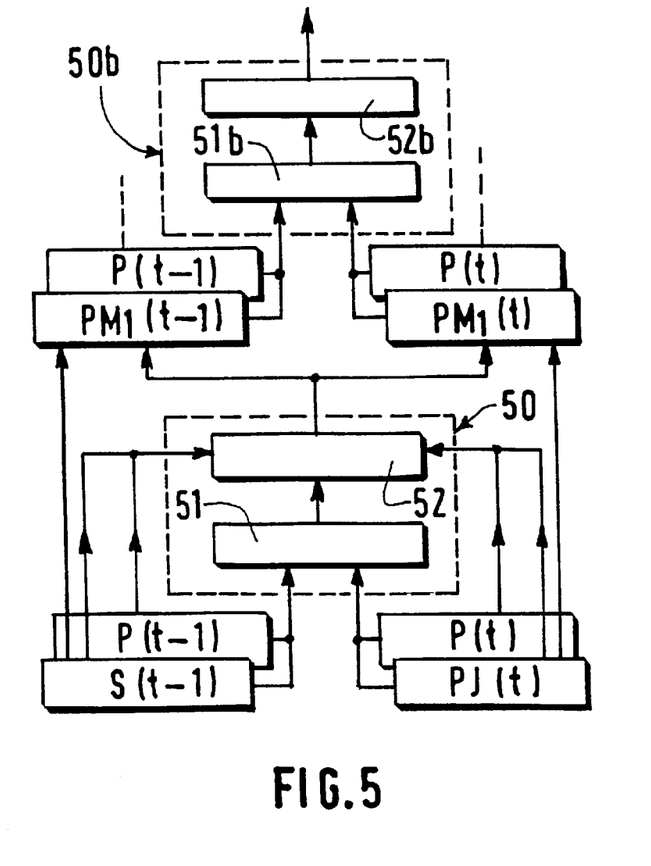
FIG. 5 shows an embodiment, in a system of encoding segmented images, of a succession of circuits for merging the regions (here, two circuits) each comprising a motion estimation device as shown in FIG. 4.

To realize the possible merging of regions in this encoding system, the system comprises at least a circuit 50 for merging the regions, comprising, as illustrated in FIG. 5, a motion estimation device 51 and a device 52 for proposing the merging of regions. The device 51, which is of the type described above (device 40), receives two original textured images P(t−1) and P(t), on the one hand, referred to as previous image and current image, respectively, and the segmented image or partition S(t−1) which corresponds to P(t−1), on the other hand, as well as the projected partition denoted PJ(t), and computes the motion parameters of this partition PJ(t) describing the motion of each region of PJ(t) between the instants (t−1) and t.

When the motion parameters of PJ(t) are known, an estimation of the cost consequences of merging neighboring regions may be made in the device 52. For each possible pair of adjacent regions, this merging consequence is computed and the pairs of regions presenting the smallest consequences of merging are selected. For example, in accordance with a first merging criterion, two adjacent regions are re-arranged (to a single one) if the consequence of encoding the prediction error corresponding to the situation where these two regions are now considered as a single one (i.e. when they are motion-compensated by means of the same set of motion parameters) is smaller than the consequence of encoding the contour constituting the boundary between the two regions. In accordance with another criterion, which may be used if the encoding method is not known in advance, the compensation error may be taken into account: the consequence considered is the variation of the mean quadratic (compensation) error when the two regions concerned are separately compensated. A proposition for merging these two regions is then possibly made, so that in the case of merging new partitions $PM_1(t-1)$ and $PM_1(t)$ are henceforth available.

These two partitions $PM_1(t-1)$ and $PM_1(t)$ constitute, with the original images P(t−1) and P(t), the signals which, for a possible repetition of the motion estimation and merging proposition processes, are transmitted to a second circuit 50b for merging the regions (comprising a second motion estimation device 51b and a second merging proposition device 52b), and so forth for other possible merging levels. The assembly of these merging levels is then associated with similar levels obtained by resegmentation for constituting the tree of partitions in which the regions constituting the optimal partition are chosen.

It should be noted that the invention is not limited to the embodiments described, and that many variants based on these embodiments may be conceived without passing beyond the scope of the invention.

For example, in the first step 10 of initializing the motion parameters, it is possible to choose motion hypotheses other than those taken into consideration, or to choose a larger number of them before performing the selection, as initial motion of the region $R_i$ considered, of that one which generates the smallest prediction error.

In the course of the second step 20 of intermediate processing, it is also possible to accelerate the process of estimating the parameters by way of a sub-sampling operation, or, after having facilitated the convergence of this process by way of the filtering operation proposed hereinbefore, to prevent it from ending at a local minimum, by effecting a hierarchic analysis of the images. The estimation principle remains the same, but the differences of implementation (although this is simplified due to the fact that one is now closer to the motion to be estimated) are the following:

initialization: for each region, the hypothesis "zero motion" or the hypothesis "field of vectors" (both described above) is tested, subsequently the motions of the "parent" region of the region considered and of the parent regions of the regions adjacent to this region considered are tested in the case where S(t) results from a new segmentation, or, in the case where S(t) results from a merging of regions, the motions of all the "children" regions of the region considered and the children regions of the regions adjacent to this region considered are tested, preprocessing: no filtering operation;

refinement: performed on the non-filtered images.

Figure 6:
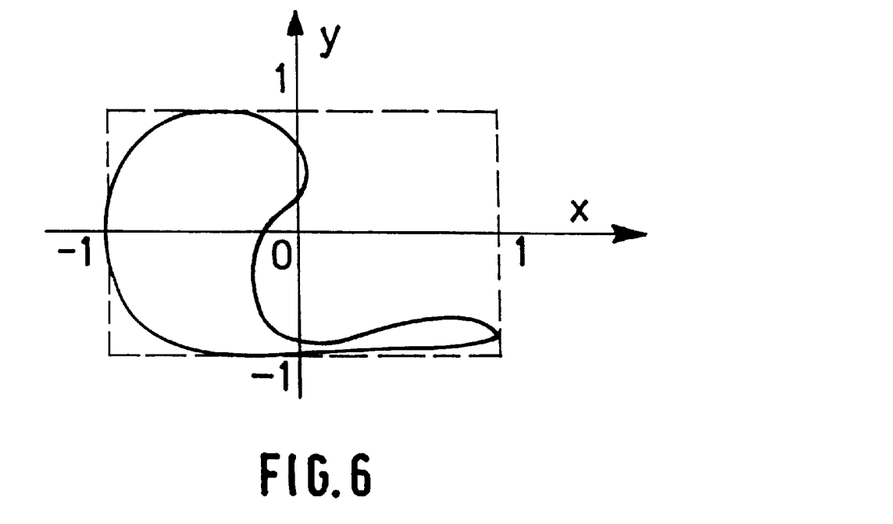
FIG. 6 shows, for one region, an example of a local reference, with, for example, a coefficient 2 standardization.

During the third step 30 of refining the motion parameters, the refinement computations are effected in a local reference in the region considered whose center is the center of the horizontal rectangle circumscribing the region and whose axes are parallel to the edges of the image, while the units at x and y are the maximum dimensions of the region in these directions, divided by a standardization coefficient. FIG. 6 shows such an example of a local reference in the case where the standardization coefficient is equal to 2 for a region of the shape shown. An example of changing the reference for the horizontal component of a related motion is clarified in this case for a region having maximum horizontal and vertical dimensions Lx and Ly, with an associated local reference whose center has coordinates (Xc,Yc) with respect to the global reference related to the image and whose horizontal motion component expressed locally is: Dx=a+b.x+c.y. If N is the standardization coefficient, the parameters expressed in the global reference related to the image will be A, B and C such that, independent of X and Y in this region R:

$$a + b \cdot x + c \cdot y = a + b \cdot \frac{X - Xc}{\frac{Lx}{N}} + c \cdot \frac{Y - Yc}{\frac{Ly}{N}} = A + B \cdot X + C \cdot Y$$

or:

$$A = a - \left(b \cdot \frac{N}{Lx} \cdot Xc\right) - \left(c \cdot \frac{N}{Ly} \cdot Yc\right)$$

$$B = b \cdot \frac{N}{Lx}$$

$$C = c \cdot \frac{N}{Ly}$$

Other embodiments are also possible, for example, the bicubic filters which are used for the prediction operation and have a fixed pitch, but may also have a variable pitch, or, when the matrix A is constructed, the possible weighting of contributions of different pixels of a region so as to preclude the pixels which are subject to noise or to occlusion phenomena and to give more weight to the points where the luminance variation is induced by the searched motion. It will also be noted that the previous description only corresponds to particular implementations of the invention and that, for example, an embodiment including particularly a microprocessor for executing the series of instructions corresponding to the functions of certain or all elements in these previous embodiments is possible, all this in conformity with the invention.

I claim:

1. A method of estimating motion between images forming a sequence P(t−n), P(t−n+1), . . . , P(t−2), P(t−1), P(t), . . . , corresponding to a sequence S(t−n), S(t−n+1), . . . , S(t−2), S(t−1), S(t), . . . , of segmented images, or partitions, composed of I regions $R_i$ identified by labels, said method successively comprising, for supplying, per region $R_i$ and in the form of a motion vector defined by motion parameters, information $M_i(t)$ which is representative of the motion of the current image P(t) with respect to a previous image P(t−1), the following three operations each performed for each region of the current image:

(1) a first step of initializing the motion parameters of each region $R_i$ of the current image P(t), the initialized values of the motion parameters being a function of the images before segmentation P(t−1) and P(t), the segmented images S(t−1) and S(t), and motion information $M_i(t-1)$ estimated for the previous current image P(t−1) in a previous performance of the method;

(2) a second step of intermediate processing of the images on which the estimation of the motion and of the parameters of this motion, is performed, and a third step of refining the motion parameters for the definitive determination of said parameters in the form of a vector (Dx, Dy) for all the pixels of the image of each of said regions $R_i$ in such a way that for each coordinate point (x,y) of the region, L(x,y,t)=L(x−Dx, y−Dy, t−1), L(.) designating the luminance or a video signal which is more complex, such as a combination of chrominance and luminance signals, and Dx, Dy being polynomials the degree of which is related to the type of motion of the region;

(3) the iterative repetition of said second and third steps of intermediate processing and refinement until the end of this iterative process as a function of at least a given criterion so as to finally obtain the I motion information $M_i(t)$.

2. A method as claimed in claim 1, in which said first step of initializing the motion parameters comprises the following sub-steps:

(A) a first sub-step of defining motion hypotheses for each region $R_i$ considered;

(B) a second sub-step of predicting, on the basis of the image P(t−1), the region corresponding to each region $R_i$ in the image P(t), taking each of the previous motion hypotheses into account, and of computing the corresponding prediction errors;

(C) a third sub-step of comparing said computed prediction errors for each region $R_i$ considered and of selecting, as an initial motion of this region, that motion hypothesis which corresponds to the smallest prediction error.

3. A method as claimed in claim 2, in which said second step of intermediate processing comprises a filtering preprocessing operation by means of an isotropic Gaussian filter.

4. A method as claimed in claim 2, wherein said three operations of initialization, intermediate processing and refinement are followed by an additional operation of controlled propagation to the regions neighboring each region $R_i$ in accordance with which the following sub-steps are repeated for each region $R_i$:

(a) a new sub-step of predicting, on the basis of the image P(t−1), each of said neighboring regions in the image P(t), taking a motion hypothesis in these regions into account which corresponds to that associated with the motion parameters resulting from said definitive determination, and of computing the corresponding additional prediction error;

(b) a sub-step of comparing said additional prediction error and the prediction error associated with the motion hypothesis retained as the initial motion of the neighboring region considered, and of selecting, as motion of each of said neighboring regions, that one to which the smallest of these two prediction errors corresponds.

5. A method of estimating motion between images forming a sequence P(t−n), P(t−n+1), . . . , P(t−2), P(t−1), P(t), . . . , corresponding to a sequence S(t−n), S(t−n+1), . . . , S(t−2), S(t−1), S(t), . . . , of segmented images, or partitions, composed of I regions $R_i$ identified by labels, said method successively comprising, for supplying, per region $R_i$ and in the form of a motion vector defined by motion parameters, information $M_i(t)$ which is representative of the motion of the current image P(t) with respect to a previous image P(t−1), the following three operations each performed for each region of the current image:

(1) a first step of initializing the motion parameters of each region $R_i$ of the current image P(t) as a function of the images before segmentation P(t−1) and P(t), segmented images S(t−1) and S(t), and motion information $M_i(t-1)$ estimated for the previous current image P(t−1) in a previous performance of the method; wherein said first step comprises the sub-steps of (a) defining motion hypotheses for each region $R_i$ considered; (b) predicting, on the basis of the image P(t−1), the region corresponding to each region $R_i$ in the image P(t), taking each of the previous motion hypotheses into account, and of computing the corresponding prediction errors; and (c) comparing said computed prediction errors for each region $R_i$ considered and of selecting, as an initial motion of this region, that motion hypothesis which corresponds to the smallest prediction error;

(2) a second step of intermediate processing of the images on which the estimation of the motion and of the parameters of this motion, is performed, and a third step of refining the motion parameters for the definitive determination of said parameters in the form of a vector (Dx, Dy) for all the pixels of the image of each of said regions $R_i$ in such a way that for each coordinate point (x,y) of the region, L(x,y,t)=L(x−Dx, y−Dy, t−1), L(.) designating the luminance or a video signal which is more complex, such as a combination of chrominance and luminance signals, and Dx, Dy being polynomials the degree of which is related to the type of motion of the region;

(3) the iterative repetition of said second and third steps of intermediate processing and refinement until the end of this iterative process as a function of at least a given criterion so as to finally obtain the I motion information $M_i(t)$ wherein for the determination of the vector Dx,Dy associated with each region $R_i$ considered, said third refinement step comprises an operation of minimizing the sum of the square values of the prediction errors for the pixels of the image of said region $R_i$ or a sub-set of these pixels, this sum being written as: $\Sigma_{(x,y)}(L(x,y,t)-L(x-Dx,y-Dy, t-1))^2$.

6. A method as claimed in claim 5, wherein said minimization is effected by means of the Gauss-Newton approximation method by effecting a first-order limited development of said sum after substituting Dx and Dy for $(Dx_0+dx)$ and $(Dy_0+dy)$, respectively, by making equal to 0 the derivatives of said limited development with respect to each coefficient of dx and dy, and by retaining, as variation values of the motion parameters leading to the smallest quadratic error, the solutions of the set of n equations with n unknown quantities obtained subsequent to these operations.

7. A device for estimating motion between images forming a sequence $P(t-n)$, $P(t-n+1)$, ..., $P(t-2)$, $P(t-1)$, $P(t)$, ..., corresponding to a sequence $S(t-n)$, $S(t-n+1)$, ..., $S(t-2)$, $S(t-1)$, $S(t)$, ..., of segmented images, or partitions, composed of I regions $R_i$ identified by labels, and for supplying, per region $R_i$ and in the form of a motion vector defined by motion parameters, information $M_i(t)$ which is representative of the motion of the current image $P(t)$ with respect to a previous image $P(t-1)$, the device comprising:

a first stage for initializing the motion parameters of each region of the current image, the initial values of the motion parameters being selected based on the criterion of motion hypotheses and for each region, that motion for which the sum of the square values of the prediction errors in the pixels of the image of the region is minimal, a second stage for intermediate processing, and a third stage for refining the motion parameters by an approximated determination of the vector (Dx,Dy) associated with each region, and means for repeating the intermediate processing and refining process for each region until at least one preselected criterion is met.

8. A device as claimed in claim 7, characterized in that said intermediate processing operation comprises an isotropic Gaussian filtering operation intended to accelerate the convergence of said iterative process.

9. A device as claimed in claim 7, characterized in that said motion hypotheses amount to four, namely: zero motion, motion having a translation equivalent to that of the center of gravity of the region, motion evaluated as the best between this label and its neighbors in the previous partition, and motion estimated by implementing a block-matching method referred to as BMA.

10. A system of encoding segmented images, or partitions, corresponding to a sequence of initial images in which said partitions are bounded by contours and regions identified by associated labels, said system comprising means for generating, for each successive partition referred to as current partition, encoded signals corresponding to a partition referred to as optimal partition and composed either of regions extracted from a partition referred to as main partition and determined directly by motion estimation and compensation of a partition preceding said current partition, or of regions extracted from additional partitions created by merging or, in contrast, by resegmentation of regions of said main partition, characterized in that, in view of said possible merging, the system comprises at least a circuit for merging the regions, comprising a motion estimation device as claimed in claim 7 and a device for proposing the merging of regions concerned.

11. An encoding system as claimed in claim 10, characterized in that it comprises several region-merging circuits in series for constituting as many levels of distinct partition levels referred to as upper levels, said upper levels being associated with said main partition and with lower levels determined in a similar manner by way of successive resegmentations for constituting a tree of partitions providing a complete assembly of regions from which the final set of regions constituting said optimal partition to be encoded is chosen for each current partition.

* * * * *